Figure 1:
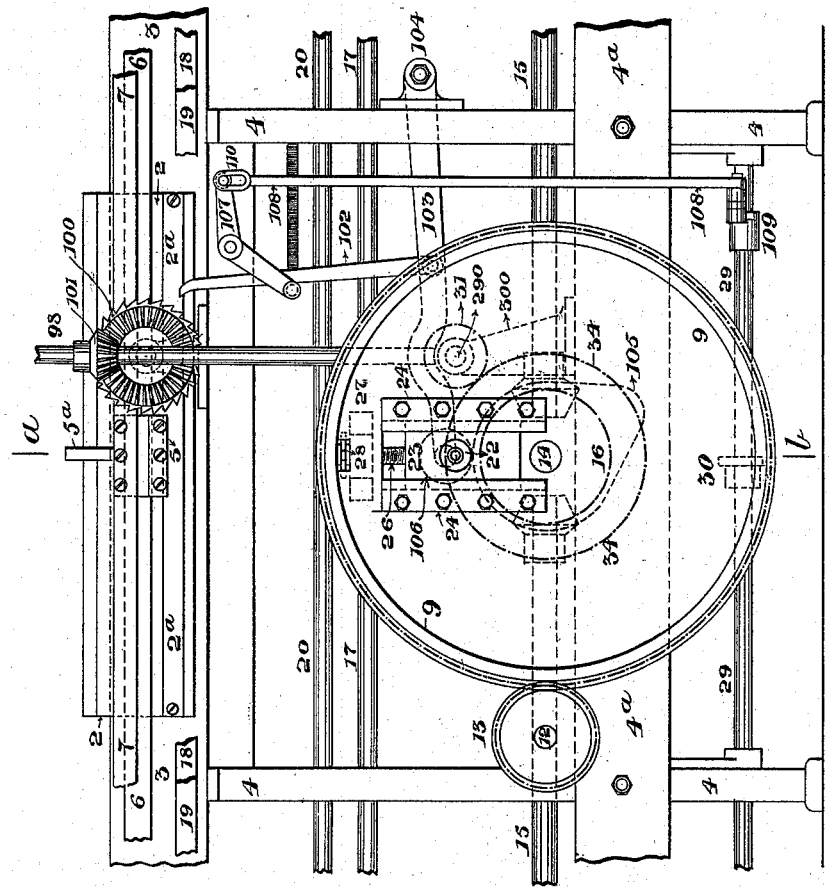

(No Model.) 5 Sheets—Sheet 1.

R. CHALLANDS, F. W. PARE & J. H. SMITH.
KNITTING MACHINE.

No. 568,190. Patented Sept. 22, 1896.

(No Model.)  5 Sheets—Sheet 2.

R. CHALLANDS, F. W. PARE & J. H. SMITH.
KNITTING MACHINE.

No. 568,190. Patented Sept. 22, 1896.

Witnesses:

Inventors:—
Richard Challands
F. W. Pare
J. H. Smith
by their Attorney (No Model.) 5 Sheets—Sheet 3.
R. CHALLANDS, F. W. PARE & J. H. SMITH.
KNITTING MACHINE.

No. 568,190. Patented Sept. 22, 1896.

(No Model.) 5 Sheets—Sheet 4.

R. CHALLANDS, F. W. PARE & J. H. SMITH.
KNITTING MACHINE.

No. 568,190. Patented Sept. 22, 1896.

Witnesses:
F. B. Keefer
N. H. Robbins

Inventors:
Richard Challands,
F. W. Pare &
J. H. Smith
by Ewell & Dick atty

UNITED STATES PATENT OFFICE.

RICHARD CHALLANDS, FREDERICK WILLIAM PARE, AND JAMES HILL SMITH, OF NOTTINGHAM, ENGLAND.

KNITTING-MACHINE.

SPECIFICATION forming part of Letters Patent No. 568,190, dated September 22, 1896.

Application filed January 7, 1896. Serial No. 574,654. (No model.)

*To all whom it may concern:*

Be it known that we, RICHARD CHALLANDS, FREDERICK WILLIAM PARE, and JAMES HILL SMITH, subjects of the Queen of Great Britain, residing at Nottingham, in the county of the town of Nottingham, England, have invented certain new and useful Improvements in and Applicable to Knitting-Machines; and we do hereby declare that the following is a full, clear, and exact description of the invention, such as will enable others skilled in the art to which it appertains to make and use the same.

This invention relates to the means for driving straight and parallel bar latch-needle knitting-machines in which provision is made or means provided for varying the number of needles in work automatically during the manufacture of the same article or fabric.

In latch-needle knitting-machines of the kind herein referred to as at present constructed the needles in the needle-bed, or in each needle-bed when there are more than one in the same machine, are actuated by a cam which is traversed to and fro across the needle-bed, and such cams have a constant amount of motion or length of traverse and make a constant number of traverses in a given time, from which it follows that unless the width of the fabric produced is kept constantly at its maximum the possible output of the machine is not obtained. Thus in a machine with a needle-bed thirty inches wide producing a fabric the full width of the needle-bed at the rate of fifty courses per minute there are fifteen hundred inches of loops formed in that time, or the machine produces work at the rate of a fifteen-hundred-inch course per minute. If on the same machine running at the same speed a fabric twenty inches wide is being made, only one thousand inches of loops per minute are formed, or the machine is producing work at the rate of a one-thousand-inch course per minute.

Now the object of this invention is the provision of mechanisms for enabling fabrics of varying widths to be knitted at a constant inch-course speed by varying the length of the traverse of the knitting-cam according to the variations in the width of the fabric being knitted and coincidently varying the number of traverses made by the knitting-cam, so that the length of the traverse multiplied by the number of traverses on any width of fabric will give a constant inch-course speed, as before explained, on all widths of the fabric, such inch-course speed being determined by the gage and type of machine, the quality of yarn used, and other circumstances which at the present time control the rate at which knitting is performed in other similar machines.

It should be noted that in all machines of the kind herein referred to the length of the traverse of the knitting-cam is greater than the width of the needles in work by the length of the cam and twice the lead of the same. The length of the traverse of the cam according to this invention is varied according to the width of the needles in work, and whenever the length of the traverse of the cam is referred to hereinafter the above explanation is to be regarded.

Figure 2:
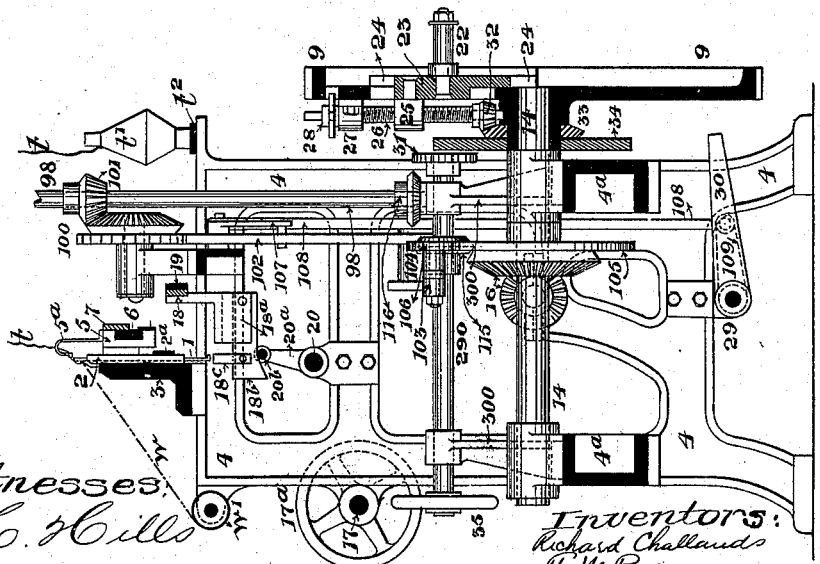
Figures 4, 5:
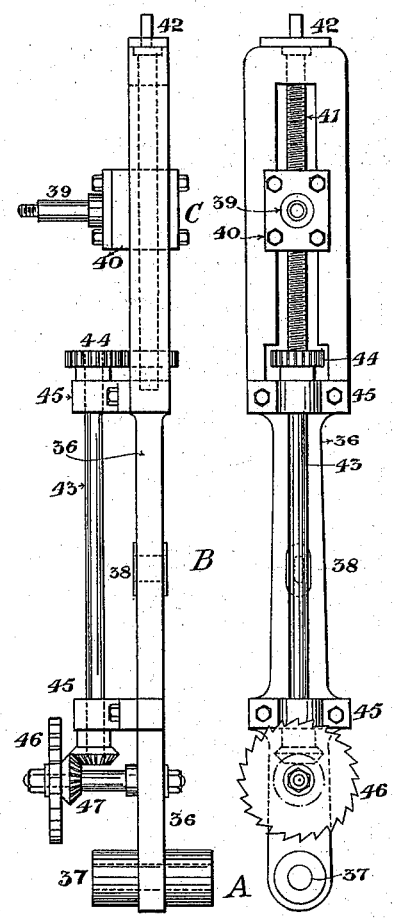
Figure 3:
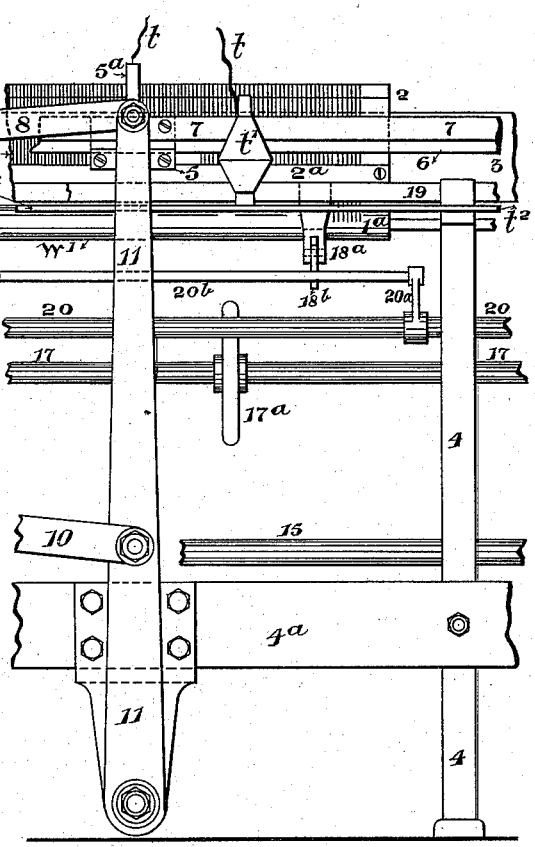
Figure 6:
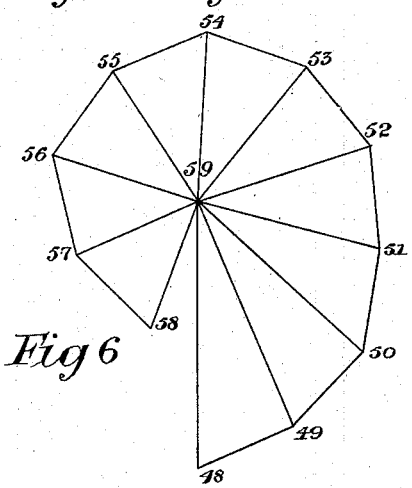
Figure 9:
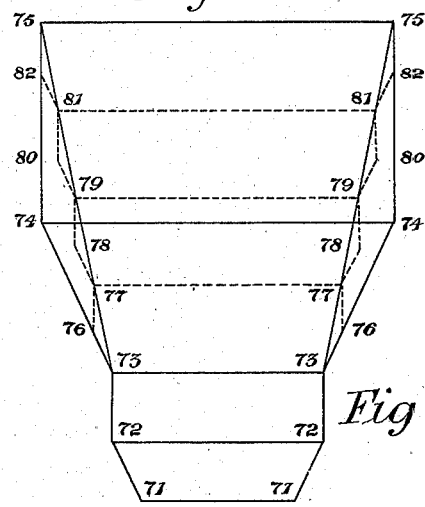
Figure 7:
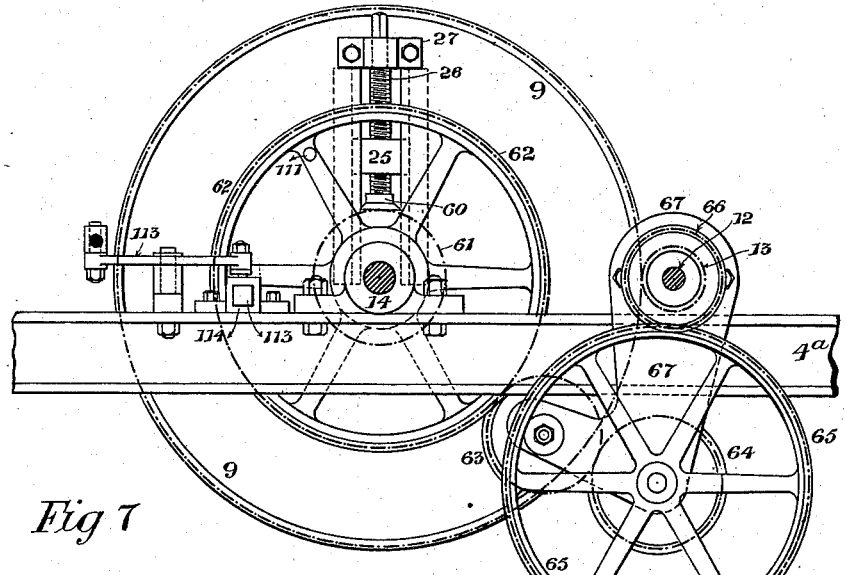
Figure 10:
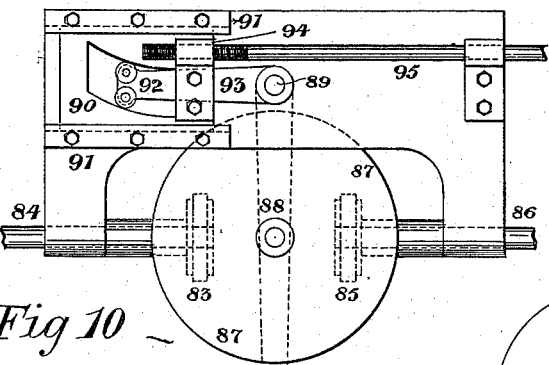
Figure 11:
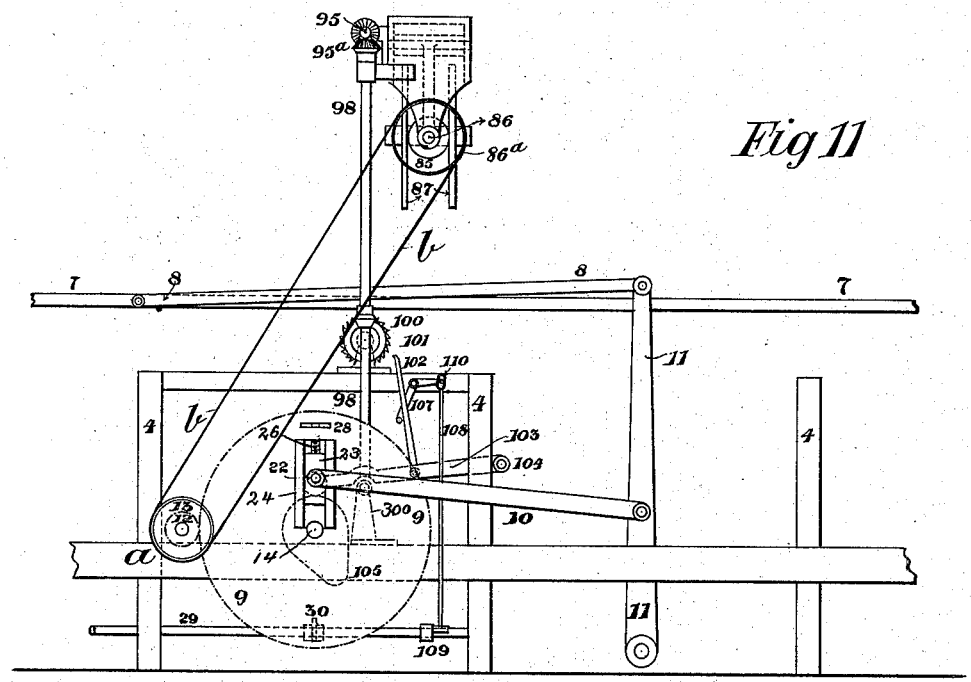
Figure 12:
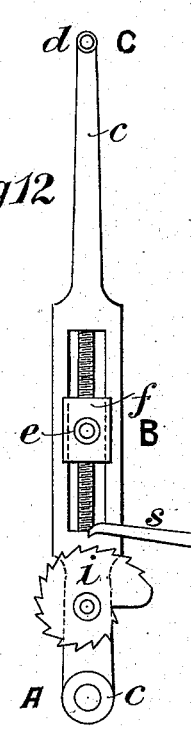
Figure 13:
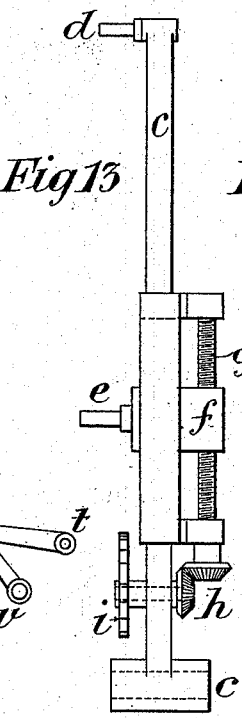
Figures 14, 15:
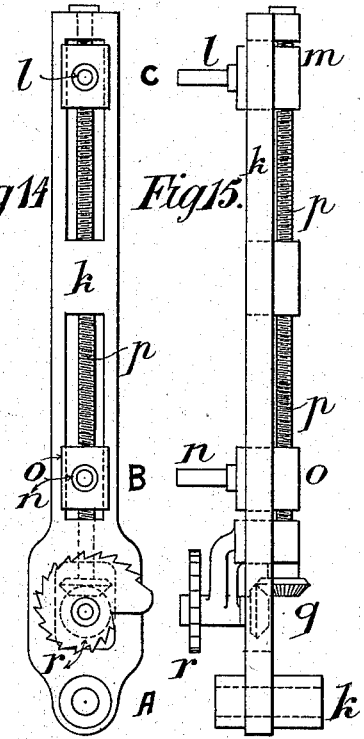
Figure 16:
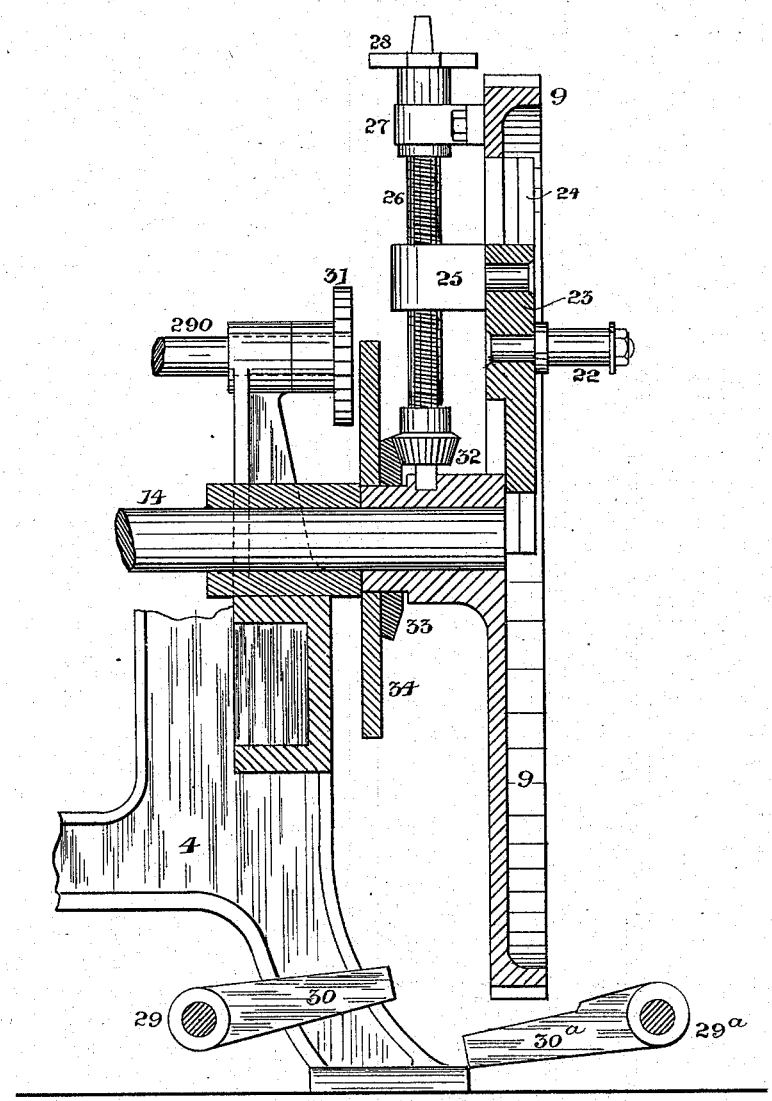

In the accompanying drawings, which illustrate means for carrying out this invention when applied to a straight-bar latch-needle machine, Figure 1 is an elevation of the back of one division of the machine fitted with means for carrying out this invention according to one arrangement. Fig. 2 is a sectional elevation on the line $a\,b$, Fig. 1. Fig. 3 is an elevation of part of the back of one division of a machine, showing the lever actuating the cam-boxes and parts of the ordinary machine. (Not shown in Fig. 1.) Figs. 4 and 5 are front and side elevations of a lever with mechanisms for moving one of its axles to and from the fulcrum. Fig. 6 is a diagram illustrating the method of setting out one of the ratchet-wheels herein referred to. Fig. 7 is an elevation, and Fig. 8 a plan, of an arrangement of mechanism by which the traverse of the cam may be varied continuously. Fig. 9 is a diagram referred to in explanation of a method of using the mechanism shown in Figs. 7 and 8. Fig. 10 is an elevation of a frictional driving-gear and means by which the speed of the machine may be so varied that the cam traverses at a constant inch-course speed while making traverses of varying lengths. Fig. 11 is an elevation of parts of the machine seen from the back, showing the relative positions of the driving mechanisms and the connections between the same. Figs. 12 and 13 are front and side elevations, respectively, of an intermediate lever with mechanism for moving its center axle to and from the fulcrum. Figs. 14 and 15 are front and side elevations, respectively, of a similar lever with mechanism for moving both its axles to and from the fulcrum. Fig. 16 is a section of the crank-wheel and connected parts, showing means for increasing and decreasing the throw of the crank.

In the machine selected to illustrate this invention there are standards 4, upon which are supported the needle-beds 2, which are suitably grooved for the needle jacks or slides to work in and have a bar $2^a$ for retaining the needles in such grooves. This bar allows the needles to slide freely and also forms a stop-plate onto which the needle-nibs are brought when the needles are out of work, as shown at $1^a$, Fig. 3. The needle-beds are attached to an angle-plate 3, which is firmly attached to the standards 4 and forms a top tie-bar to the machine. The knitting-cams 5 are fitted to slide on a bar 6, which is carried by brackets from the standards, and all the cams on the machine are connected to a bar 7, which is driven from the crank-wheel 9 through a connecting-rod 10, intermediate lever 11, and connecting-rod 8, this latter being connected to the bar 7. The crank-wheel 9 is mounted on a shaft 14 and is driven from the pulley-shaft 12 by a pinion 13. The shaft 14 drives the cam-shaft 15 through the bevel-wheels 16, and the cam-shaft 15 is geared to the hand-wheel shaft 17, on which are the usual hand-wheels $17^a$. The machine is provided with fast and loose pulleys $a$, Fig. 11, and suitable levers for moving the belt $b$, Fig. 11, such levers being connected to a stop-rod in the front of the machine.

The spools or bobbins $t'$ are mounted on a bobbin-rail $t^2$, and the yarn $t$, after passing a tension appliance, is fed to the needles by thread-carriers $5^a$, which are arranged to travel to and fro with the cam-boxes, while the work $w$ is wound upon rollers $w'$, which are rotated by weights or ratchet mechanism.

For increasing the number of needles in work the machine is provided with two bars 18 and 19, suitably supported and guided and connected to the nuts of the fashioning-screws at the ends of the machine and are so arranged and actuated that the bars move in opposite directions. The bar 18 is, for the left-hand side of each division of needles, fitted with brackets $18^a$, in which is a lever $18^b$, fitted with a striking-piece $18^c$, while the under edge of the lever $18^b$ is cam-shaped, as shown in Fig. 2. The lever $18^b$ is held in contact with a rod $20^b$, which is carried by arms $20^a$ on a shaft 20, which is oscillated by a cam on the shaft 15. The bar 19 is similarly fitted with brackets and levers for the right-hand side of each division of the machine, and the latter levers are also actuated by the rod $20^b$.

The fashioning-screws are actuated by ratchet mechanism in the usual way and their action is so timed in relation to the oscillations of the shaft 20 that the motion of the latter occurs after the motion of the screws, by which arrangement the lifter-lever $18^b$ is brought under the needle to be next raised into action before the lever is itself actuated.

The bars 18 and 19 have an end movement for every additional needle that is brought into work, and after the desired width of the fabric being knitted is attained and the length of the fabric completed the additional needles are thrown out of work, the loops on the same being first removed.

The lower part of the standards are braced together by tie-bars $4^a$, the tie-bar at the back extending across the machine while the front tie-bar may extend across one or more divisions only.

Now according to this invention the crank-pin 22, Figs. 1 and 2, is carried by a block 23, which is fitted to slide in guides 24 on the face of the wheel 9. At the back of the wheel the block 23 is fitted with a nut 25, which is tapped for a screw 26, which has one bearing in the crank-wheel boss and a top bearing 27. On the outer end of this screw is a star-wheel 28, and also a brake arrangement for preventing the screw being moved unintentionally. For working the screw automatically the machine is fitted with a rocking shaft 29, the motion of which is derived from or controlled by pattern mechanism. On the shaft 29 is a lever 30, so arranged that when the shaft is rocked the lever is brought into the path of one arm of the star-wheel 28 as this is carried round by the crank-wheel 9. The star-wheel is thus caused to partially rotate, and in rotating actuates or turns the screw 26 by which the crank-pin 22 is moved to or from the center of the crank-wheel and the length of the traverse of the knitting-cams thereby varied.

When it is desired to automatically decrease as well as increase the throw of the crank-pin 22, the machine is fitted with a lever $30^a$, Fig. 16, which is carried by a shaft $29^a$ and arranged to act upon the opposite side of the star-wheel 28 to that acted upon by the lever 30. The lever $30^a$ is thrown in and out of action by pattern mechanism similar to that used in connection with shaft 29 and lever 30.

For winding the crank-pin to its starting position after an article has been completed the end of the screw 26 may be squared for a handle and be operated by the attendant. Preferably this is done by mechanism operated from the front of the machine by means of a shaft 290, which is carried by brackets 300 and fitted with a spur-wheel 31. On the inner end of the screw 26 is a bevel-pinion 32, gearing into a bevel-wheel 33, which is fitted to revolve on the crank-wheel boss and carries a spur-wheel 34. The shaft 290 is fitted to slide in its bearings and is moved endwise until the wheel 31 is in gear with the wheel 34. The shaft is then rotated by the wheel 35 until the crank-pin has been moved to the desired position, after which the shaft is pulled back again and the wheels 31 and 34 thrown out of gear.

When the machine is driven by a fixed crank-pin or a cam, the variation in the length of the traverse of the knitting-cam is obtained by varying the distance between the fulcrum of the intermediate lever and the centers of the connecting-rods on the same. One way of doing this is shown in Figs. 4 and 5. The lever 36 has its fulcrum at 37 and is provided at 38 with a slot for carrying the axle of the crank-connecting rod. The axle 39 for the cam-box-connecting rod is fitted to slide in the upper end of the lever and to form a nut for the screw 41. For turning the screw automatically it is geared by wheels 44 to a shaft 43, which is carried by bearings 45 on the lever and is geared by wheels 47 to a ratchet-wheel 46, which is actuated by a clawker like that shown in Fig. 12 thrown in and out of action by pattern mechanism.

When a lever constructed as described is at work, equal increases in the length of the traverse of the knitting-cam are obtained by giving equal amounts of movement to the axle 39, the stroke of the crank remaining constant.

In this and the subsequently-described illustrations of this part of our invention we have for the sake of clearness merely shown the mechanism for automatically increasing the traverse of the cam.

In the lever $c$ (shown in Figs. 12 and 13) the cam-connecting-rod axle $d$ is rigidly attached to the lever, while the crank-connecting-rod axle $e$ is mounted on a block $f$, which is fitted to slide in the lever and is actuated by a screw $g$ through gear-wheels $h$ from a ratchet-wheel $i$.

In the lever $k$ (shown in Figs. 14 and 15) the cam-connecting-rod axle $l$ is mounted on a block $m$ and the crank-connecting-rod axle $n$ on a block $o$. Both blocks are fitted to slide in the lever $k$ and are actuated by a right and left handed screw $p$, which is driven by a ratchet-wheel $r$ through gear-wheels $q$. In these modifications the axle B, Figs. 12 and 13, and axles B and C, Figs. 14 and 15, have to be moved variable distances for equal variations in the length of the traverse of the knitting-cam and such variable movement may be obtained by means of a spiral ratchet-wheel so designed that equal movements of its edge will move it through varying angles. In Fig. 6 such a wheel is shown, the distance between any two consecutive numbers on the page being equal and such distance subtend different angles at the center.

For actuating the ratchet-wheels shown in Figs. 4, 5, 12, 13, 14, and 15 a pawl or clawker $s$, Fig. 12, is pivoted upon a fixed axle $t$ and the wheels are actuated when brought into contact with the pawl by the oscillations of the lever. The pawl is thrown in and out of action by the lever $u$, mounted upon a shaft $v$, which is actuated by the pattern mechanism.

Figure 8:
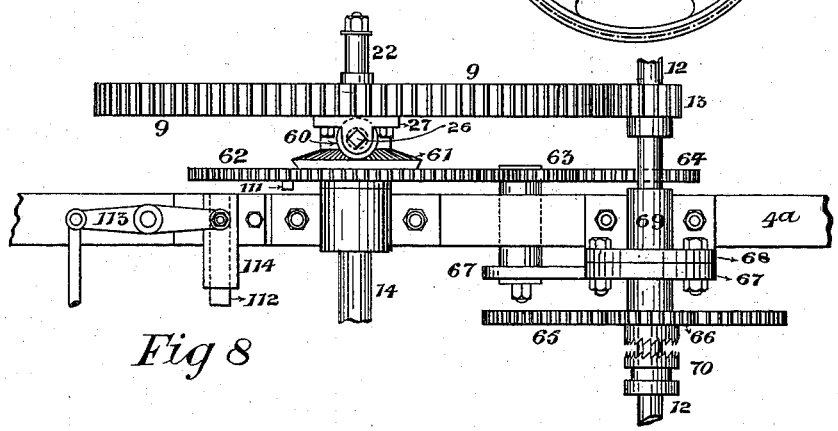

In Figs. 7 and 8 there is shown an arrangement of mechanism for giving a continuous movement to the crank-pin 22 which is carried and fitted similarly to the crank-pin shown in Figs. 1 and 2. The crank-pin screw 26 is fitted with a pinion 60, which is geared to a wheel 61, loosely mounted on the crank-wheel boss and attached to a wheel 62 similarly mounted. The wheel 62 is geared by an intermediate wheel 63 to another wheel 64, which is carried by the same axle as a wheel 65, which is geared to a wheel 66 on the driving-shaft 12. The wheel 63 is introduced for the purpose of changing the direction of motion, and this wheel, together with the wheels 64 and 65, is carried by a banjo-plate 67 which is fitted to turn on the shaft 12 and held in position by being bolted to a flange 68 on the bearing 69, the whole arrangement being similar to a banjo-plate arrangement on a turning-lathe. The wheel 66 is preferably loosely mounted on the shaft 12 and is connected thereto as required by a clutch 70, which is thrown in and out of action by pattern mechanism. In one arrangement the wheels 9 and 13 are in the ratio of eight to one, and the screw makes one revolution for every five needles thrown into work at each side of each needle-bed; also the wheels 60 and 61 are in the ratio of four to one. For each revolution of the wheel 61 the screw makes four revolutions and twenty needles at each side of the needle-bed are thrown into work. Suppose the crank to make forty revolutions during the throwing into work of the twenty needles at each side of the needle-bed. Then the wheels 61 and 62 must make one revolution more or less than the crank-wheel itself. Let the wheels 61 and 62 make forty-one revolutions, or one revolution more than the crank-wheel. In the same time the shaft 12 makes three hundred and twenty revolutions, so that forty-one to three hundred and twenty is the ratio between the revolutions of the wheels 62 and 66, from which the number of teeth in all the wheels may be obtained. As an example of working with this arrangement, suppose Fig. 9 to represent the outline of an article it is required to produce and that it is started at the line 71. The clutch 70 is thrown into gear and the length of the traverse of the knitting-cam increased as the needles are thrown into work until the line 72 is reached. The clutch is then thrown out of gear and work made of a constant width up to the line 73, when the clutch is thrown into gear again until the line 74 is reached. The clutch is then thrown out of gear again and the article completed up to the line 75. When a fabric has to be made in which the fashionings at one part are made at a different rate to the fashionings at some other part, such as an article having an outline 71 72 73 75, it is made up to the line 73 by the method already explained. The clutch is thrown into action at the line 73 and the traverse of the cam increases more rapidly than the number of needles thrown into work. At the line 76 the clutch is thrown out of action and the traverse of the cam remains constant up to the line 77, while the number of needles thrown into work gradually increases up to the same line. This operation is repeated as often as may be required. Thus in the figure the clutch is thrown into action at the lines 71, 73, 77, 79, and 81 and is thrown out of action at the lines 72, 76, 78, 80, and 82.

There is now to be described the means for varying the number of traverses made by the knitting-cam.

The length of the greatest traverse of the knitting-cam multiplied by the number of traverses made in a given time is taken as the inch-course speed, and this number divided by different lengths of traverse will give the corresponding number of traverses for such lengths of traverse. Theoretically different numbers of traverses are required for each inch-course speed adopted, but in practice and within reasonable limits the different variations in the number of traverses for different inch-course speeds are neglected, it being understood that the machine is provided with means for altering the inch-course speed without affecting the means used for varying the length of the traverse or the number of traverses.

The appliance used for obtaining the variations in the number of traverses is preferably of the disk and roller type, as shown in Fig. 10. It comprises a roller 83 on the driving-shaft 84, which revolves at a uniform speed, and a roller 85 on the driven shaft 86, from which motion is given to the shaft 12. The roller 83 imparts motion to the roller 85 by means of a pair of disks 87, which rotate on the same axle in opposite directions and are pressed upon the rollers by a spring. The variation in the speed of the driven shaft 86 is obtained by varying the relative positions of the rollers and disks, and the required movements are calculated in the same way as the movements of the belt used with a pair of conical pulleys. The disks or the rollers may be moved to obtain the alteration in their relative positions, and from a series of calculations corresponding to a series of increases in the traverse of the knitting-cam or variations in the number of traverses made by the same a cam 90, Fig. 10, is set out. This cam is fitted to slide in guides 91 and actuates the lever 93 on the axle 89 through trucks 92. On the axle 89 there is also a lever 88, which carries the axle of the disks, or the cam may be of the shape shown in 97 and act upon a truck 96, carried by a prolongation of the lever 88. In the arrangement shown the cam 90 is provided with a nut 94 and is actuated by a screw 95, which is operated from the shaft 98 by the wheels 95ª, Fig. 11, or by any other convenient mechanism.

The mechanisms already described are designed to traverse the knitting-cam at a constant inch-course speed, but in practice it has been found that if the relative positions of the disks and rollers in the driving mechanism be changed by a constant amount for each variation in the number of needles in work or in the length of the traverse of the knitting-cam the difference in the number of traverses made by the knitting-cam from the calculated number is immaterial, and this latter method is preferably adopted on account of the simpler mechanism that may be used.

According to one method of thus working the machine, the disks or rollers of the driving mechanism are moved by a screw 95, which is geared to a vertical shaft 98, Figs. 1, 2, and 11. This shaft 98 has a footstep-bearing on one of the brackets 300 and is geared by wheels 101 to a ratchet-wheel 100, which is intermittently rotated by a cam 105 through a truck 106, a lever 103, pivoted at 104, and a pawl 102. This latter is lifted at every revolution of the crank-shaft, but is held clear of the ratchet-wheel, except when it is required to operate the driving mechanism by a lever 107, which is operated from a lever 109 on the shaft 29 through the link 108, which has a slot 110 to allow of the lever 29 ascending before the pawl 102 has completed its motion. On the return stroke of the clawker it is pulled clear of the wheel 100 by a spring attached to the lever 107 and is held in that position until the shaft 29 is again oscillated. For returning the disks or rollers to their starting position the shaft 98 is fitted with a wheel 116, which gears with a wheel 115 on the shaft 290 when the latter is moved endwise, and the said shaft, when rotated, operates the crank-pin screw and the disks or rollers at the same time.

In Figs. 7 and 8 an arrangement is shown for winding back the screw 26 when the wheel 62 actuates the screw by making more revolutions than the crank-wheel. On the wheel 62 is a fixed stud 111, and on the tie-bar 4ª is a bolt 112, fitted to slide in a bracket 114 and actuated by a lever 113, which is under the control of pattern mechanism. At the completion of an article the bolt 112 is moved into the path of the stud 111 and the wheels 61 and 62 are held stationary while the crank-wheel continues its rotation, and in so doing causes the screw to be turned by the wheel 60, which gears into the wheel 61 and rotates round it.

In Fig. 11 there is shown in elevation the relative positions of the driving mechanisms and the connections between the same. The parts are numbered the same as in the other drawings, and the shaft 98 is shown geared to the screw 95 by wheels 95ª, and its upper end guided by a bearing fixed to the variable drive-bracket. The driven shaft 86 is provided with a pulley 86ª and motion is communicated to a pulley $a$ on the machine-shaft 12 by a belt $b$.

The pattern mechanism herein referred to for actuating or controlling the various mechanisms may be in the form of a pattern-chain or pattern-wheel, which may be arranged and actuated in the same way as similar mechanisms used on ordinary knitting-machines, or other forms of pattern mechanism, whether automatic or operated by the attendant, may be used.

Having thus described our invention and the means for carrying out the same, what we desire to claim and secure by Letters Patent in the United States is—

1. In a knitting-machine, the combination of the needles, means controlling the number of needles at work, the operating-cam, and mechanism whereby the length of traverse of the cam is varied, substantially as set forth.

2. In a knitting-machine, the combination of the needles, means controlling the number of needles at work, the needle-operating cam, and mechanism for operating the cam, and mechanism worked by the said cam-operating mechanism, whereby the length of the traverse of the cam is varied, substantially as set forth.

3. In a knitting-machine, the combination of the needles, means controlling the number of needles at work, the needle-operating cam, the driving mechanism for the cam, and mechanism whereby the number of traverses or movements of the cam may be varied relative to the speed of the driving mechanism, substantially as set forth.

4. In a knitting-machine, the combination of the needles, means which control the number of needles at work, the needle-operating cam, the driving mechanism for the cam, mechanism whereby the length of the traverse or movement of the cam may be varied, and mechanism whereby the number of traverses of the cam may be varied relative to the speed of the driving mechanism, substantially as set forth.

5. In a knitting-machine, the combination of the needles, means which control the number of needles at work, the needle-operating cam, the crank-wheel and connections, whereby the cam is driven, and means for adjusting the crank-pin of the said wheel at different distances from its center, whereby the extent of movement of the cam is varied, substantially as set forth.

6. In a knitting-machine, the combination of the needles, the means which control the number of needles at work, the needle-operating cam, a crank-wheel and connections, whereby the cam is driven, the crank-pin of the wheel being radially adjustable, and automatic mechanism for changing the position of the crank-pin, whereby the amount of movement imparted to the cam may be varied, substantially as set forth.

7. In a knitting-machine, the combination of the needles, the means which control the number of needles at work, the needle-operating cam, means whereby the length of traverse of the cam may be varied, comprising a crank-wheel with radially-adjustable crank-pin, and mechanism for automatically changing the position of the crank-pin, and mechanism for varying automatically the speed of the said crank-wheel, substantially as set forth.

RICHARD CHALLANDS.
FREDERICK WILLIAM PARE.
JAMES HILL SMITH.

Witnesses:
HENRY LAWSON,
WILLIAM H. POTTER.